(12) United States Patent
Looman

(10) Patent No.: US 10,502,452 B2
(45) Date of Patent: Dec. 10, 2019

(54) HEAT EXCHANGER ELEMENT AND METHOD FOR MANUFACTURING SUCH A HEAT EXCHANGER ELEMENT

(71) Applicant: Winterwarm B.V., Winterswijk (NL)

(72) Inventor: Lambertus Bernardus Gerardus Looman, Winterswikj (NL)

(73) Assignee: Winterwarm B.V., Winterswijk (NL)

( * ) Notice: Subject to any disclaimer, the term of this patent is extended or adjusted under 35 U.S.C. 154(b) by 119 days.

(21) Appl. No.: 15/549,176

(22) PCT Filed: Feb. 9, 2015

(86) PCT No.: PCT/NL2015/050086
§ 371 (c)(1),
(2) Date: Aug. 7, 2017

(87) PCT Pub. No.: WO2016/129988
PCT Pub. Date: Aug. 18, 2016

(65) Prior Publication Data
US 2018/0023844 A1    Jan. 25, 2018

(51) Int. Cl.
*F24H 8/00* (2006.01)
*F24H 3/10* (2006.01)
*F28F 17/00* (2006.01)
*F28D 1/03* (2006.01)
*F28D 9/00* (2006.01)
*F28D 21/00* (2006.01)

(52) U.S. Cl.
CPC .............. *F24H 8/006* (2013.01); *F24H 3/105* (2013.01); *F28D 1/0333* (2013.01);
(Continued)

(58) Field of Classification Search
CPC ...... F24H 8/006; F24H 3/105; F24H 2210/00; F28D 1/0333; F28D 9/0043;
(Continued)

(56) References Cited

U.S. PATENT DOCUMENTS 2,979,050 A * 4/1961 Costello .................. F24H 3/087
126/104 R
4,494,598 A * 1/1985 Dehaan .................. F24H 8/006
165/178

(Continued)

FOREIGN PATENT DOCUMENTS

| EP | 2354702 A1 | 8/2011 |
|----|-----------|--------|
| WO | 00/73711 A1 | 12/2000 |
| WO | 2014/134479 A2 | 9/2014 |

*Primary Examiner* — Justin M Jonaitis
(74) *Attorney, Agent, or Firm* — N.V. Nederlandsch Octrooibureau; Catherine A. Shultz; Tamara C. Stegmann

(57) ABSTRACT

A heat exchanger includes a lamellar structure of a plurality of parallel heat exchange elements with an intermediate air gap between each pair of adjacent heat exchange elements. Along a longitudinal direction of the lamellar structure the heat exchange elements is interconnected in a top portion of the lamellar structure that forms an inlet channel through the heat exchange elements and in a bottom portion of the lamellar structure that forms an outlet channel through the heat exchange elements.
The heat exchange elements form parallel channels between the inlet and the outlet channels.
In the outlet channel, the heat exchanger includes a filler body, that is filling up a lower level of the outlet channel and forms a floor along the longitudinal direction of the lamellar structure.

13 Claims, 4 Drawing Sheets

(52) U.S. Cl.
CPC ....... *F28D 9/0043* (2013.01); *F28D 21/0008* (2013.01); *F28F 17/005* (2013.01); *F24H 2210/00* (2013.01); *F28D 2021/0024* (2013.01); *Y02B 30/106* (2013.01)

(58) Field of Classification Search
CPC ......... F28D 21/0008; F28D 2021/0024; F28D 9/005; F28D 9/0056; F28D 9/0057; F28D 1/0308; F28D 1/0366; F28D 9/0031; F28D 9/0062; F28F 17/005; F28F 3/086; F28F 9/0219; F28F 3/12; F28F 3/14; Y02B 30/106
USPC ........... 165/167, 153, 170; 126/116 R, 91 R, 126/91 A
See application file for complete search history.

(56) References Cited

U.S. PATENT DOCUMENTS

| | | | | |
|---|---|---|---|---|
| 5,094,224 | A * | 3/1992 | Diesch | F28F 1/42 |
| | | | | 126/110 R |
| 5,271,376 | A * | 12/1993 | Lu | F24H 3/105 |
| | | | | 126/110 R |
| 5,623,918 | A * | 4/1997 | Swilik, Jr. | F04D 29/4226 |
| | | | | 110/162 |
| 5,810,071 | A * | 9/1998 | Pavlin | F01M 5/002 |
| | | | | 165/284 |
| 6,357,396 | B1 * | 3/2002 | Stansfield | F24D 12/02 |
| | | | | 122/7 R |
| 6,932,080 | B2 * | 8/2005 | Looman | F24H 3/105 |
| | | | | 126/116 R |

* cited by examiner

HEAT EXCHANGER ELEMENT AND METHOD FOR MANUFACTURING SUCH A HEAT EXCHANGER ELEMENT

FIELD OF THE INVENTION

The present invention relates to a heat exchanger for an air heater. Additionally, the invention relates to a method for manufacturing such an heat exchanger. Moreover, the present invention relates to a method for operation of the heat exchanger.

PRIOR ART

In a heat exchanger in which fuel gas is burnt as heating source, the combustion of the fuel gas will produce water as one of the reaction by-products. In high efficiency heat exchangers, the burnt gas will have an initial temperature of about 1300° C., when the burnt gas enters the heat exchanger. During the flow of the gas through the heat exchanger to its exhaust, the gas flow will be cooled down to relatively low temperature below the condensation temperature of water, in order to have a heat transfer efficiency as high as possible. The condensation of the water from the gas flow results in an additional release of heat from the gas flow.

However, the condensed water should not remain in the heat exchanger and therefore should be removed. If the water remains in the heat exchanger the water can block the gas flow or can cause corrosion or other damage of the material(s) of the heat exchanger due to acidification.

From EP 1380798 a heat exchanger is known that is constructed for high efficiency heat transfer. The heat exchanger comprises various elements inter alia a burner, the lamellar structure of the heat exchanger and an exhaust system. However, the heat exchanger from the prior art is not yet a condensing heat exchanger. If the efficiency of this heat exchanger is further improved a problem of condensation of water within the heat exchanger volume will occur. The shape of the heat exchanger, in particular the outlet channel, adversely affects the removal of water.

SUMMARY OF THE INVENTION

It is an object of the invention to overcome one or more of the disadvantages of the prior art.

The object is achieved by a heat exchanger comprising a lamellar structure of a plurality of parallel heat exchange elements with an intermediate air gap between each pair of adjacent heat exchange elements;
along a longitudinal direction of the lamellar structure the heat exchange elements being interconnected in a top portion of the lamellar structure forming an inlet channel through the heat exchange elements and being interconnected in a bottom portion of the lamellar structure forming an outlet channel through the heat exchange elements; the heat exchange elements forming parallel channels between the inlet channel and the outlet channel;
in the outlet channel, the heat exchanger comprising a filler body, the filler body filling up a lower level of the outlet channel and forming a floor in the outlet channel along the longitudinal direction of the lamellar structure.

Advantageously, the heat exchanger provides a floor in the outlet channel that can function as a location where condensed water is collected and that acts as a gutter to a drain.

According to an aspect of the invention a method is provided for manufacturing a heat exchanger. The heat exchanger comprises a lamellar structure of a plurality of parallel heat exchange elements with an intermediate air gap between each pair of adjacent heat exchange elements, and the method comprises
interconnecting along a longitudinal direction of the lamellar structure the heat exchange elements in a top portion of the lamellar structure thus forming an inlet channel through the heat exchange elements, and
interconnecting in a bottom portion of the lamellar structure thus forming an outlet channel through the heat exchange elements, with the heat exchange elements forming parallel channels between the inlet channel and the outlet channel;
forming in the outlet channel of the heat exchanger a filler body, the filler body filling up a lower level of the lamellar structure and forming a floor in the outlet channel along the longitudinal direction of the lamellar structure.

Advantageously, the method allows to form a floor in the outlet channel by means of a moldable filler body that fills the internal shape of the region of the lamellar structure where the outlet channel is located, in a manner that the lower level of the lamellar structure up to the level of the opening of the outlet channel. Thus, the floor has a level that allows water that is collected on the floor, to be transported out of the outlet channel towards a drain in an exhaust.

According to an embodiment, the present invention relates to a method as described above, wherein forming the filler body in the outlet channel comprises:
providing a liquid filler material;
moulding the liquid filler material in the outlet channel of the lamellar structure, such that a liquid volume with a continuous surface along the longitudinal direction of the lamellar structure is created inside the outlet channel;
solidifying the liquid volume to form the filler body.

Using a liquid filler material has an advantageous effect, in that the filler body can be shaped after creating the lamellar structure. Also, the liquid filler provides that all cavities in the lower level of the lamellar structure are being filled, and that after the moulding the liquid filler will distribute itself evenly over the volume of the lower level of the lamellar structure. This results in a substantially flat surface in the liquid state and after solidification.

According to an embodiment, the present invention relates to a method as described above, wherein the continuous surface is a substantially flat or concave surface traverse to the longitudinal direction.

By manipulating the orientation of the lamellar structure it is possible to adapt the shape of the floor surface into a concave shape for example by forming the floor in a sequence of moulding and solidification steps under a series of rotation angles around the longitudinal axis of the outlet channel.

According to an embodiment, the present invention relates to a method as described above, wherein the method comprises that
preceding the moulding of the liquid filler material, the outlet channel is positioned under a sloped angle with the horizontal along the longitudinal direction,
the sloped position being maintained until the filler body has sufficiently solidified.

Advantageously, this step of the method provides that the floor surface can have a downward slope in a direction towards the opening of the lamellar structure where an exhaust that comprises a drain can be mounted.

According to an embodiment, the present invention relates to a method as described above, wherein the method further comprises that, preceding the moulding of the liquid filler material, the outlet channel is positioned, or additionally positioned, under a rotated angle around the horizontal along the longitudinal direction, the rotated position being maintained until the filler body has sufficiently solidified.

This embodiment allows that a floor is created that matches a counter rotated position of the lamellar structure when mounted. In this manner, the floor can have a substantially horizontal position, while the lamellar structure is positioned under an angle with the vertical.

According to an embodiment, the present invention relates to a method as described above, wherein after solidification of the filler body in the rotated position, the step is repeated under a different rotated angle.

In this embodiment, the method provides that more floors can be created in the outlet channel, wherein each floor orientation corresponds with a given vertical mounting angle of the lamellar structure.

According to an aspect of the invention a method is provided for operating a heat exchanger as described above or manufactured according to a method as described above, which method comprises:
   supplying heated combustion gas into the inlet channel of the heat exchanger;
   providing a flow of a fluid through the intermediate gaps of the lamellar structure, such that the flowing fluid absorbs heat from the heat exchange elements, and the supplied heated gas cools down to below condensation temperature of water in the region of the outlet channel;
   collecting the condensed liquid on the floor formed by the filler body, and
   draining the condensed liquid from the floor.

Advantageous embodiments are further defined by the dependent claims.

BRIEF DESCRIPTION OF THE DRAWINGS

The invention will be explained in more detail below with reference to drawings in which illustrative embodiments of the invention are shown. It will be appreciated by the person skilled in the art that other alternative and equivalent embodiments of the invention can be conceived and reduced to practice without departing from the true spirit of the invention, the scope of the invention being limited only by the appended claims.

DETAILED DESCRIPTION OF EMBODIMENTS

Figure 1:
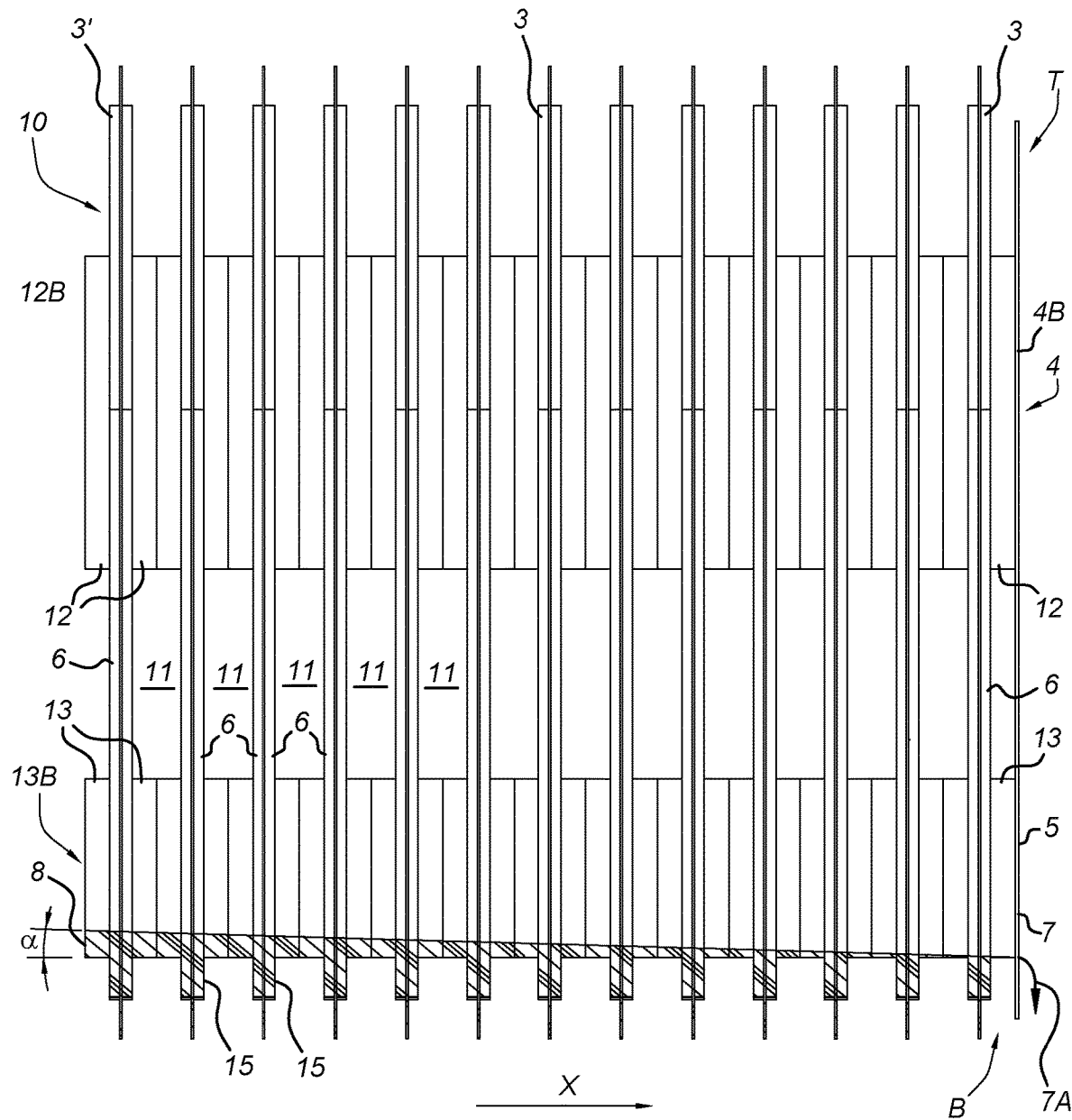
FIG. 1 shows a perspective view of an heat exchanger in accordance with an embodiment of the invention.

FIG. 1 shows a cross-sectional view of an heat exchanger in accordance with an embodiment of the invention.

The heat exchanger 1 consists of a plurality of interconnected and parallel heat exchange elements 3 forming a lamellar structure 10. In this lamellar structure the heat exchange elements 3 are preferably substantially rectangular hollow plates that are connected gastight to each other with a intermediate gap 11 in between two adjacent heat exchange elements 3.

Various production process are available to form such a heat exchange element 3 as will be known to the skilled in the art. For example, the heat exchange elements 3 may be formed by a deep drawing process from plate material such that shells are produced with an inlet duct part 12 and outlet duct part 13. The heat exchange element is then formed by welding two shells at their periphery.

By interconnecting the heat exchange elements at the inlet and outlet duct parts, the lamellar structure is created. In the lamellar structure an inlet channel 4 is formed by the interconnected inlet duct parts of the heat exchange elements 3 and an outlet channel 5 is formed by the interconnected outlet duct parts of the heat exchange elements 3. Between the inlet channel 4 and the outlet channel 5, the heat exchange elements 3 form parallel interconnecting channels 6 for a gas flow.

At one end of the lamellar structure the heat exchange element 3' is arranged with a blind end plate to provide closing 12B; 13B of the inlet channel 4 and outlet channel 5.

Typically, the inlet channel 4 will be located in a top portion T of the heat exchanger and the outlet channel 5 in a bottom portion B, when the heat exchanger is installed for use.

In accordance with the invention, in the outlet channel 5 a floor 8 is provided as shown in the opening 7 of the outlet channel 5. The floor 8 is at a same level as the level of the opening 7 of the outlet channel 5.

According to an embodiment of the invention, the bottom portion B of the lamellar structure 10 of the heat exchanger is provided with a filler body, in such a way that the filler body fills up a lower level of the bottom portion B up to at least the level of the opening 7 of the outlet channel 5 in the shell of the lamellar structure. The filler body fills cavities 15 in the heat exchange elements below the level of the opening by forming a floor 8 in the outlet channel which runs along the longitudinal direction X of the lamellar structure.

Moreover, by creating a floor 8 which has a downward slope towards the opening of the outlet channel in the lamellar structure, any collected water can be guided to this opening and to a drain (not shown) located in an exhaust (not shown) connected to the opening 7 of the outlet channel 5. In FIG. 1, the slope of the floor is indicated by an angle α. Alternatively, the heat exchanger could be mounted in a sloped position if the floor level is even along the longitudinal axis X of the lamellar structure.

Figure 2:
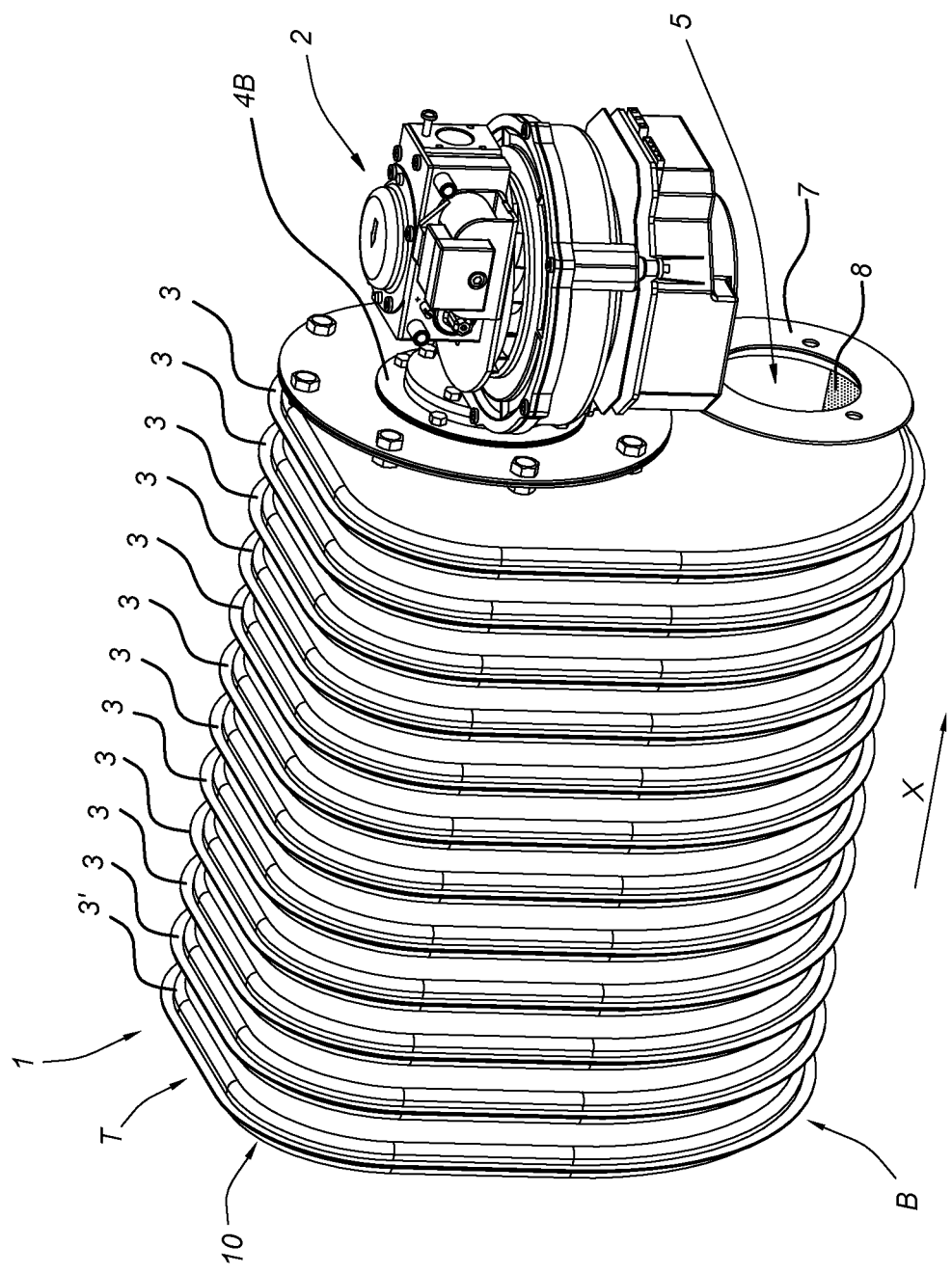
FIG. 2 shows a cross-sectional side view of the lamellar structure according to an embodiment.

FIG. 2 shows a cross-sectional side view of the lamellar structure 10 according to an embodiment.

The heat exchanger 1 which is designed for use of a (relatively) high temperature gas as heat source is coupled at an input 4B of the inlet channel 4 to a burner 2, which is arranged to produce a flow of high temperature combustion gas into the inlet channel.

The burner 2 may be a burner operating at relative overpressure, i.e., a pressurized or extracted burner to provide that the combustion process can occur in at least the inlet channel. Through the parallel interconnecting channels (schematically indicated by dashed arrow 6) in the heat exchange elements 3 the gas flow is guided from the inlet channel 4 towards the outlet channel 5.

In the heat exchanger 1 the heat of the combustion gas is transferred to ambient gas that (is forced to) flow through the intermediate gaps 11. As the combustion gas cools down to a temperature below the condensation temperature of water (say 100° C.), water produced in the combustion reaction will condense in the heat exchange elements 3. Advantageously, the floor 8 in the outlet channel provides a surface where water can be collected. Also, since the cavities 15 below the level of the outlet channel 5 are filled up, the interior parts of the heat exchange elements are protected from corrosion by the water and any components from the combustion gas that may be collected in the water.

According to an embodiment, the floor 8 is created by a method that comprises the formation of the floor after the manufacturing of the lamellar structure 10. The formation of the floor 8 is preferably done by moulding a liquid filler material into the opening 7 of the outlet channel 5 in the bottom portion B in the lamellar structure 10. The liquid filler material consists of a synthetic material (i.e., a plastic material). The liquid filler material will distribute itself over the internal area in the bottom portion and form an even surface. Next, the liquid filler material can be solidified into a filler body that forms the floor 8 in the bottom portion of the lamellar structure.

According to an embodiment, the method comprises forming in the outlet channel of the heat exchanger a filler body, the filler body filling up a lower level of the lamellar structure and forming a floor in the outlet channel along the longitudinal direction of the lamellar structure.

In a further embodiment, the formation of the filler body in the outlet channel comprises: providing a liquid filler material; moulding the liquid filler material in the outlet channel of the lamellar structure, such that a liquid volume with a continuous surface along the longitudinal direction of the lamellar structure is created inside the outlet channel; solidifying the liquid volume to form the filler body.

The method advantageously allows to form the filler body after the creation of the lamellar structure in a simple manner. Additionally, the method allows to convert or to retrofit prior art heat exchangers.

In an embodiment, the filler material is a synthetic material, such as a thermosetting or thermoplastic material.

Depending on the liquid filler material type, solidification is achieved by a suitable mechanism as known in the prior art: e.g., crystallization or polycondensation or polymerization. The solidification may be done at any suitable temperature known in the prior art: e.g., room temperature or an elevated temperature.

As will be appreciated by the skilled in the art, the filler material is typically stable at the operating temperature of the heat exchanger at the location of the outlet channel, i.e., has a degradation temperature, plasticizing temperature or melting temperature above the local operating temperature.

In an embodiment, the filler material is selected to be stable below a minimal temperature of about 110° C.

Figure 3A:
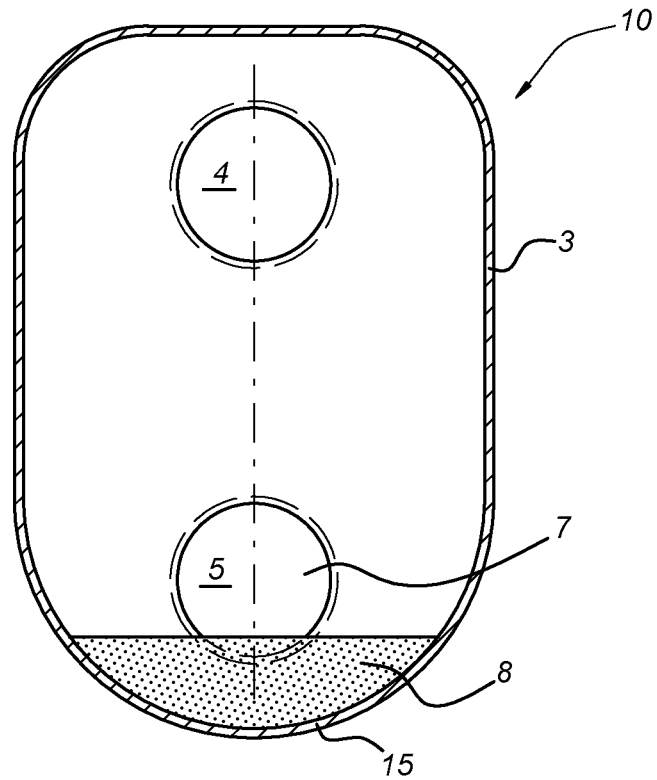
FIGS. 3a and 3b show a cross-sectional view of the lamellar structure according to an embodiment.
Figure 3B:
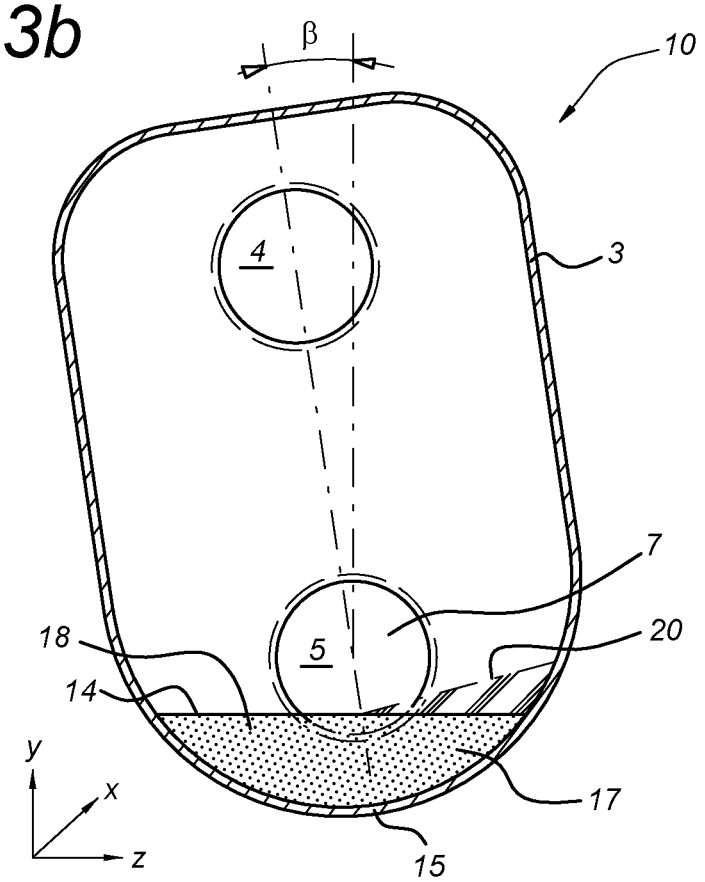

FIGS. 3a and 3b show a cross-sectional view of the lamellar structure according to an embodiment.

In FIG. 3a, a cross-section of the lamellar structure 10 of the heat exchanger is shown with an horizontal floor 8 formed by the filler body. Typically, the floor 8 is formed by the method as described above. The floor provides that no water can be collected in the cavities 15 of the heat exchange elements 3 below the opening 7 of the outlet channel 5 in the lamellar structure. In particular when the floor 8 is arranged with a downward slope towards the opening in the lamellar structure, sufficient drainage of water from the heat exchanger may be provided.

In a further embodiment, as shown in FIG. 3b, the floor 8 is arranged with a downward slope towards the opening of the outlet channel and with a substantially concave cross-section 14 transverse to the slope direction to act as a gutter in such a way that in a heat exchange element water is collected at a locally lowest level and then is transported towards the opening of the outlet channel.

The concave cross-section 14 is formed in accordance with the method of the invention, by forming a series of even floors in a succession, in which each floor is allowed to solidify before the next floor is created. To obtain an concave shape, between the solidification of one floor and the formation of a subsequent floor, the method provides that the orientation of lamellar structure is adapted in such a manner that an angle between the surface of the one floor and the subsequent floor can be created.

In FIG. 3b the floor is V-shaped and formed in two subsequent steps. In a first orientation of the lamellar structure 10, a first portion of the floor 18 is formed by moulding the liquid filler material into the internals of the lamellar structure, followed by a solidification of the liquid filler material. In a next step, the lamellar structure is arranged in a second orientation (i.e. rotated over an angle β around the longitudinal axis of the outlet channel). Next, moulding of the liquid filler material (and solidification) is done to form a second floor portion 20 under the angle β relative to the orientation of the first floor.

The skilled in the art will appreciate that this method can be used to form various shapes of the floor or even a number of separate floors within the outlet channel 5 by adapting the orientation of the lamellar structure 10 either by rotation along the longitudinal axis of the outlet channel or by rotation along a horizontal axis transverse to the longitudinal axis of the outlet channel.

According to an embodiment, the method comprises that preceding the moulding of the liquid filler material, the outlet channel is positioned under a sloped angle with the horizontal along the longitudinal direction of the outlet channel, and the sloped position is maintained until the filler body has sufficiently solidified.

In an embodiment the solidification has advanced to such extent that the solid filler body retains its shape.

According to an embodiment, the method comprises that, preceding the moulding of the liquid filler material, the outlet channel is positioned, or additionally positioned, under a rotated angle around the horizontal along the longitudinal direction of the outlet channel, and the rotated position is maintained until the filler body has sufficiently solidified.

After solidification of the filler body into a floor (portion) in the rotated position, the step can be repeated under a different rotated angle.

Figure 4:
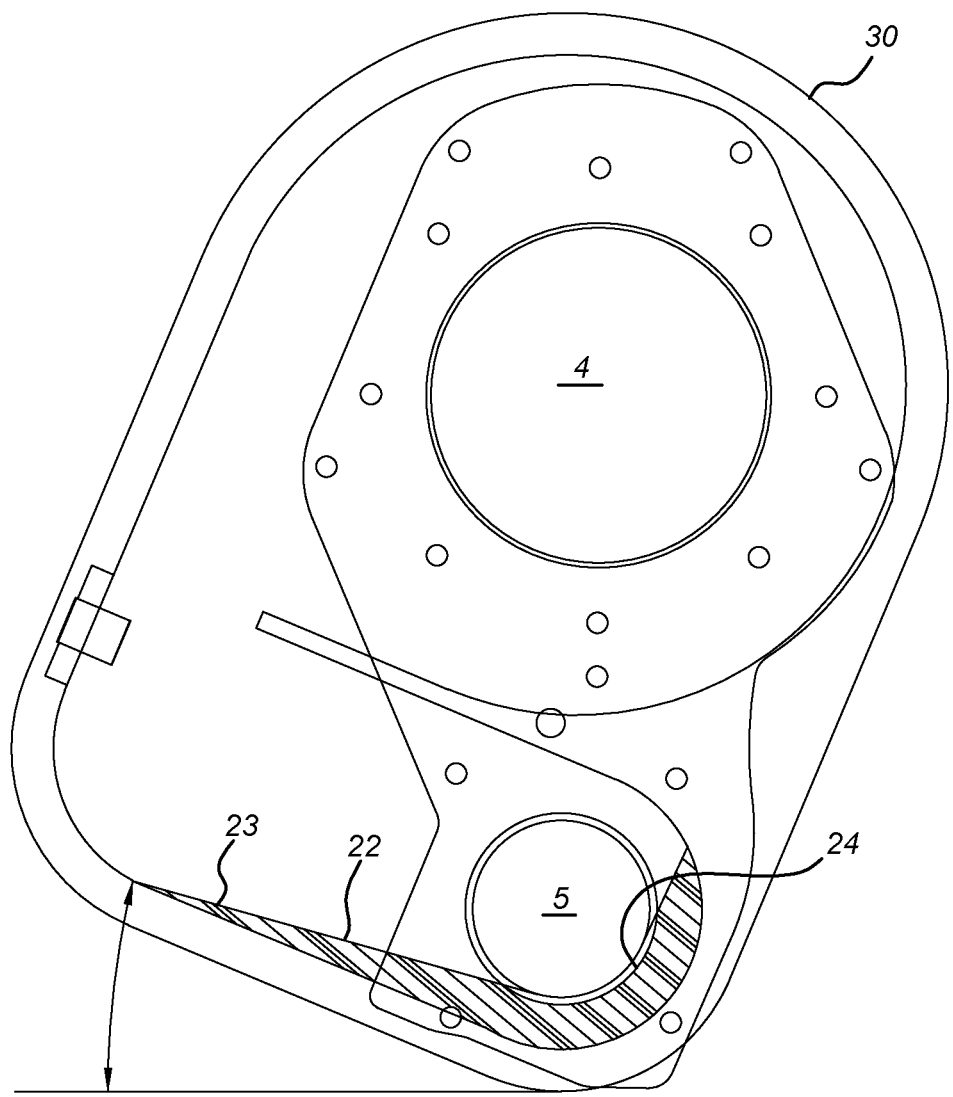
FIG. 4 shows a cross-sectional view of the lamellar structure according to an embodiment.

FIG. 4 shows a cross-sectional view of a lamellar structure 30 according to an embodiment.

According to this embodiment, the position of the outlet channel in the heat exchange elements is asymmetric. To allow that the mounted lamellar structure can be oriented under a range of rotation angles around the outlet channel 5, the floor 22 has a curl shape extending from a substantially flat portion 23 to a substantially rounded portion 24. In view of the foregoing description, the skilled in the art will appreciate how such a floor 22 can formed by the method according to the invention.

The heat exchanger according to the invention can be used in various applications, such as air heaters, water heaters (e.g., for central heating systems) or in general fluid heaters.

In such applications the heat exchanger according to the invention that comprises a floor in the outlet channel as described above, is operated by a method that comprises supplying heated combustion gas into the inlet channel of the heat exchanger by means of a burner;

providing a flow of a fluid through the intermediate gaps of the lamellar structure, such that the flowing fluid absorbs heat from the heat exchange elements, and the supplied heated gas within the heat exchanger cools down to below condensation temperature of water in the region of the outlet channel;

collecting the condensed liquid on the floor formed by the filler body, and draining the condensed liquid from the floor.

The flowing fluid that absorbs the generated heat can be selected from a gas such as air or a liquid such as water. Other fluids and applications for the heat exchanger will be known to the person skilled in the art.

The invention has been described with reference to some specific embodiments. Obvious modifications and alterations will occur to others upon reading and understanding the preceding detailed description. It is intended that the invention be construed as including all such modifications and alterations insofar as they come within the scope of the appended claims.

The invention claimed is:

1. A heat exchanger comprising a lamellar structure of a plurality of parallel heat exchange elements with an intermediate air gap between each pair of adjacent heat exchange elements; along a longitudinal direction of the lamellar structure the heat exchange elements being interconnected in a top portion of the lamellar structure forming an inlet channel through the heat exchange elements and being interconnected in a bottom portion of the lamellar structure forming an outlet channel through the heat exchange elements; the heat exchange elements forming parallel channels between the inlet channel and the outlet channel; in the outlet channel, the heat exchanger comprising a filler body, the filler body filling up cavities of the heat exchange elements below an opening of the outlet channel and forming a floor in the outlet channel along the longitudinal direction of the lamellar structure wherein the floor in the outlet channel is sloped downwards in the longitudinal direction of the lamellar structure towards an exhaust, and wherein the lamellar structure is provided with a drain for liquid at the exhaust of the outlet channel.

2. The heat exchanger according to claim 1 wherein the floor of the filler body has a substantially flat or concave surface traverse to the longitudinal direction.

3. The heat exchanger according to claim 1, wherein, in use, the inlet channel is arranged for receiving hot combustion gas from a burner and the heat exchanger is configured to cool the hot combustion gas to a temperature below condensation of water from the combustion gas at the outlet channel.

4. The heat exchanger according to claim 1, wherein the filler body is made of a synthetic material.

5. The heat exchanger according to claim 4, wherein the filler body material is a thermoplastic or thermosetting material.

6. The heat exchanger according to claim 4, wherein the filler body material has a degradation, or plasticizing or melting temperature above 100° C.

7. Method for manufacturing a heat exchanger comprising a lamellar structure of a plurality of parallel heat exchange elements with an intermediate air gap between each pair of adjacent heat exchange elements; the method comprising:
—interconnecting along a longitudinal direction of the lamellar structure the heat exchange elements in a top portion of the lamellar structure thus forming an inlet channel through the heat exchange elements, and—interconnecting in a bottom portion of the lamellar structure thus forming an outlet channel through the heat exchange elements, with the heat exchange elements forming parallel channels between the inlet channel and the outlet channel;
—forming in the outlet channel of the heat exchanger a filler body, the filler body filling up cavities of the heat exchange elements below an opening of the outlet channel and forming a floor in the outlet channel along the longitudinal direction of the lamellar structure, wherein the filler body material is a thermoplastic or thermosetting synthetic material, and wherein the floor in the outlet channel is sloped downwards in the longitudinal direction of the lamellar structure towards an exhaust.

8. Method according to claim 7, wherein forming the filler body in the outlet channel comprises:

providing a liquid filler material;

moulding the liquid filler material in the outlet channel of the lamellar structure, such that a liquid volume with a continuous surface along the longitudinal direction of the lamellar structure is created inside the outlet channel;

solidifying the liquid volume to form the filler body.

9. Method according to claim 8, wherein the continuous surface is a substantially flat or concave surface traverse to the longitudinal direction.

10. Method according to claim 8, wherein the method comprises that preceding the moulding of the liquid filler material, the outlet channel is positioned under a sloped angle with the horizontal along the longitudinal direction, the sloped position being maintained until the filler body has sufficiently solidified.

11. Method according to claim 8, wherein the method further comprises that, preceding the moulding of the liquid filler material, the outlet channel is positioned, or additionally positioned, under a rotated angle around the horizontal along the longitudinal direction of the outlet channel, the rotated position being maintained until the filler body has sufficiently solidified.

12. Method according to claim 11, wherein after solidification of the filler body in the rotated position, the step is repeated under a different rotated angle.

13. Method for operating a heat exchanger according to claim 1, comprising: —supplying heated combustion gas into the inlet channel of the heat exchanger; —providing a flow of a fluid through the intermediate gaps of the lamellar structure, such that the flowing fluid absorbs heat from the heat exchange elements, and the supplied heated gas within the heat exchanger cools down to below condensation temperature of water in the region of the outlet channel; —collecting the condensed liquid on the floor formed by the filler body, and—draining the condensed liquid from the floor, wherein the floor in the outlet channel is sloped downwards in the longitudinal direction of the lamellar structure towards an exhaust.

* * * * *